United States Patent
Inoue et al.

(10) Patent No.: US 12,103,356 B2
(45) Date of Patent: Oct. 1, 2024

(54) VEHICLE AIR CONDITIONING CONTROLLER, STORAGE MEDIUM AND AIR CONDITIONING CONTROL METHOD

(71) Applicant: TOYOTA JIDOSHA KABUSHIKI KAISHA, Aichi-ken (JP)

(72) Inventors: Teiko Inoue, Toyota (JP); Mitsuyoshi Ohno, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 331 days.

(21) Appl. No.: 17/495,820

(22) Filed: Oct. 7, 2021

(65) Prior Publication Data

US 2022/0118820 A1 Apr. 21, 2022

(30) Foreign Application Priority Data

Oct. 19, 2020 (JP) ................................. 2020-175488

(51) Int. Cl.
*B60H 1/00* (2006.01)
*B60R 1/12* (2006.01)

(52) U.S. Cl.
CPC ..... *B60H 1/00742* (2013.01); *B60H 1/00792* (2013.01); *B60H 1/00871* (2013.01); *B60R 1/12* (2013.01); *B60H 2001/00721* (2013.01); *B60R 2001/1223* (2013.01); *B60R 2001/1238* (2013.01)

(58) Field of Classification Search
CPC ............ B60H 1/00742; B60H 1/00792; B60H 1/00871; B60H 2001/00721; B60R 1/12; B60R 2001/1223; B60R 2001/1238
See application file for complete search history.

(56) References Cited

U.S. PATENT DOCUMENTS

2019/0225156 A1* 7/2019 Sasaki ...................... B60R 1/12

FOREIGN PATENT DOCUMENTS

| JP | 201948600 A | | 3/2019 |
| JP | 2019111964 A | * | 7/2019 |
| JP | 2019127154 A | | 8/2019 |

OTHER PUBLICATIONS

English Translation of JP2019111964A (Year: 2019).*

* cited by examiner

*Primary Examiner* — Andrew J Cromer
(74) *Attorney, Agent, or Firm* — HAUPTMAN HAM, LLP

(57) ABSTRACT

Provided is a vehicle air conditioning controller including a memory and a processor coupled to the memory, wherein the processor determines whether or not an occupant in a cabin of a vehicle is applying makeup to herself/himself and, in a case in which it has been determined that the occupant is applying makeup, changes at least one of an air direction or an air volume of conditioned air that is generated by an air conditioning system installed at the vehicle and is supplied to the occupant from an air outlet provided in the cabin.

17 Claims, 9 Drawing Sheets

VEHICLE AIR CONDITIONING CONTROLLER, STORAGE MEDIUM AND AIR CONDITIONING CONTROL METHOD

CROSS-REFERENCE TO RELATED APPLICATION

This application is based on and claims priority under 35 USC 119 from Japanese Patent Application No. 2020-175488 filed on Oct. 19, 2020, the disclosure of which is incorporated by reference herein.

BACKGROUND

Technical Field

This disclosure relates to a vehicle air conditioning controller, a storage medium, and an air conditioning control method.

Related Art

Japanese Patent Application Laid-open (JP-A) No. 2019-127154 discloses a vehicle that assists an occupant applying makeup in a cabin. In this vehicle, when a makeup mode that assists the application of makeup by the occupant is started, a voltage is applied to dimmer films provided on window glasses so that the window glasses are shaded. This allows the occupant to apply makeup without being seen by, for example, passersby outside the vehicle.

In this connection, when an air conditioning system for keeping the temperature in the cabin at a comfortable level is installed at the vehicle, there are cases where the air from the air conditioning system hits the occupant applying makeup and thus annoys the occupant.

For example, the air from the air conditioning system may annoy the occupant by drying out the occupant's eyes. Alternatively, the air from the air conditioning system may annoy the occupant by causing powder makeup to scatter near the occupant's face and soil the occupant's clothes or by causing liquid makeup to dry out before it is applied to the occupant's face.

SUMMARY

This disclosure has been made in view of the above points, and it is an object thereof to obtain a vehicle air conditioning controller that enhances comfort when an occupant applies makeup in a cabin in consideration of conditioned air supplied to the cabin from an air conditioning system.

A vehicle air conditioning controller pertaining to a first aspect of the disclosure includes: a makeup application determination unit that determines whether or not an occupant in a cabin of a vehicle is applying makeup; and a conditioned air changing unit that, in a case where the makeup application determination unit has determined that the occupant is applying makeup, changes at least one of the air direction and the air volume of conditioned air that is generated by an air conditioning system installed at the vehicle and is supplied to the occupant from an air outlet provided in the cabin.

The vehicle air conditioning controller pertaining to the first aspect of the disclosure determines whether or not the occupant in the cabin of the vehicle is applying makeup. The vehicle air conditioning controller, in a case where it has determined that the occupant is applying makeup, changes at least one of the air direction and the air volume of the conditioned air supplied to the occupant from the air outlet provided in the cabin. Because of this, for example, it becomes possible to reduce the airflow of the conditioned air flowing toward the occupant when the occupant applies makeup. As a result, the vehicle air conditioning controller can reduce annoyance felt by the occupant applying makeup because of the conditioned air, and can enhance comfort when the occupant applies makeup in the cabin of the vehicle.

A vehicle air conditioning controller pertaining to a second aspect of the disclosure is the configuration of the first aspect, further including a makeup application area acquisition unit that acquires information relating to the area to which the occupant is applying makeup, wherein the conditioned air changing unit changes, with reference to the information acquired by the makeup application area acquisition unit, at least one of the air direction and the air volume of the conditioned air in accordance with the area to which the occupant is applying makeup.

The vehicle air conditioning controller pertaining to the second aspect of the disclosure can change at least one of the air direction and the air volume of the conditioned air in accordance with the area to which the occupant is applying makeup, so it can optimize, in accordance with the area to which the occupant is applying makeup, the airflow resulting from the conditioned air.

A vehicle air conditioning controller pertaining to a third aspect of the disclosure is the configuration of the second aspect, wherein the conditioned air changing unit references the information acquired by the makeup application area acquisition unit and, in a case in which the area to which the occupant is applying makeup is a predetermined area other than around the eyes, changes at least one of the air direction and the air volume of the conditioned air to thereby change the air conditioning state in the cabin to a first air conditioning state and, in a case in which the area to which the occupant is applying makeup is around the eyes, changes at least one of the air direction and the air volume of the conditioned air to thereby change the cabin to a second air conditioning state in which, compared to the first air conditioning state, the conditioned air supplied to the occupant is restricted.

In the vehicle air conditioning controller pertaining to the third aspect of the disclosure, when the occupant is applying makeup around her/his eyes, the air conditioning state in the cabin is changed from the first air conditioning state, which is set in a case where the occupant is applying makeup to another area of her/his face, to the second air conditioning state. In the second air conditioning state, the conditioned air supplied to the occupant applying makeup is restricted compared to the first air conditioning state. Consequently, for example, by sufficiently restricting the conditioned air flowing toward the occupant when the occupant is applying makeup around her/his eyes, which the occupant cannot blink while applying makeup to them, the occupant's eyes can be prevented from being dried out. Furthermore, liquid makeup used around the eyes, such as mascara, can be inhibited from being dried out. Because of this, comfort when the occupant applies makeup around her/his eyes can be enhanced.

A vehicle air conditioning controller pertaining to a fourth aspect of the disclosure is the configuration of the third aspect, further including a face position inference unit that infers the position of the occupant's face, wherein in the second air conditioning state in the cabin the conditioned air changing unit changes the air direction of the conditioned air to a direction that avoids the position of the occupant's face inferred by the face position inference unit.

The vehicle air conditioning controller pertaining to the fourth aspect of the disclosure infers the position of the occupant's face. The vehicle air conditioning controller, by changing the cabin to the second air conditioning state when the occupant applies makeup around her/his eyes, changes the air direction of the conditioned air supplied to the occupant to a direction that avoids the position of the occupant's face that has been inferred. Because of this, the conditioned air is kept from being directly blown onto the occupant's face, so the occupant's eyes can be effectively inhibited from being dried out and makeup can be effectively inhibited from being scattered and dried out. As a result, comfort when the occupant applies makeup around her/his eyes can be enhanced.

A vehicle air conditioning controller pertaining to a fifth aspect of the disclosure is the configuration of the fourth aspect, wherein the conditioned air changing unit, after changing the cabin to the second air conditioning state, references the information acquired by the makeup application area acquisition unit and, in a case in which it has judged that the occupant has finished applying makeup around her/his eyes, changes the air direction of the conditioned air to the direction of the position of the occupant's face.

The vehicle air conditioning controller pertaining to the fifth aspect of the disclosure, in a case where it has judged that the occupant has finished applying makeup around her/his eyes, changes the air direction of the conditioned air from the direction in the second air conditioning state that avoids the position of the occupant's face to the direction of the position of the occupant's face. Because of this, the conditioned air is supplied around the occupant's eyes after the occupant has finished applying makeup to them, and liquid makeup applied around the eyes can be efficiently dried. As a result, makeup applied around the eyes can be inhibited from running.

A vehicle air conditioning controller pertaining to a sixth aspect of the disclosure is the configuration of any one of the first aspect to the fourth aspect, further including an air outlet selection unit that, in a case where the makeup application determination unit has determined that the occupant is applying makeup, selects, from among a plurality of air outlets provided in the cabin, a predetermined air outlet disposed in front of the occupant applying makeup, wherein the conditioned air changing unit changes at least one of the air direction and the air volume of the conditioned air supplied to the occupant from the predetermined air outlet.

The vehicle air conditioning controller pertaining to the sixth aspect of the disclosure, when the occupant applies makeup, changes at least one of the air direction and the air volume of the conditioned air supplied from the predetermined air outlet disposed in front of the occupant. Because of this, the vehicle air conditioning controller can distinguish between and perform air conditioning with respect to an occupant not applying makeup and air conditioning with respect to an occupant applying makeup. As a result, another occupant not applying makeup can stay comfortable without the air conditioning being restricted.

A vehicle air conditioning controller pertaining to a seventh aspect of the disclosure is the configuration of any one of the first aspect to the sixth aspect, wherein in the cabin of the vehicle a sun visor is disposed in front of the occupant, and the makeup application determination unit determines that the occupant is applying makeup in a case where a mirror of the sun visor is in use and determines that the occupant is not applying makeup in a case where the mirror is not in use.

The vehicle air conditioning controller pertaining to the seventh aspect of the disclosure determines that the occupant is applying makeup in a case where the mirror of the sun visor is in use. Consequently, the conditioned air is automatically changed when the occupant starts to use the mirror of the sun visor to apply makeup. In this way, whether or not the occupant is applying makeup can be easily determined based on the movements of the occupant starting to apply makeup in the cabin of the vehicle.

A vehicle air conditioning controller pertaining to an eighth aspect of the disclosure is the configuration of any one of the first aspect to the sixth aspect, wherein in the cabin of the vehicle a first camera capable of capturing an image of the occupant's face is disposed, and the makeup application determination unit determines that the occupant is applying makeup in a case where it has determined, based on the image captured by the first camera, that the occupant is applying makeup to a predetermined area of her/his face.

The vehicle air conditioning controller pertaining to the eighth aspect of the disclosure determines whether or not the occupant is applying makeup based on the image of the occupant's face captured by the first camera, so it can grasp in detail the actions of the occupant and can accurately determine whether or not the occupant is applying makeup.

Furthermore, the vehicle air conditioning controller determines that the occupant is applying makeup only in a case where it has determined that the occupant is applying makeup to a predetermined area of her/his face, so in a case where, for example, the occupant is applying makeup to an area largely unaffected by the conditioned air, the temperature in the cabin can be maintained at a comfortable level without restricting the conditioned air.

A vehicle air conditioning controller pertaining to a ninth aspect of the disclosure is the configuration of any one of the fourth aspect to the eighth aspect, wherein in the cabin of the vehicle a second camera capable of capturing an image of the occupant's face is disposed, and the face position inference unit infers the position of the occupant's face by recognizing, based on the image captured by the second camera, the position of the occupant's eyes.

The vehicle air conditioning controller pertaining to the ninth aspect of the disclosure infers the position of the occupant's face by recognizing, based on the image of the occupant's face captured by the second camera, the position of the occupant's eyes. Because of this, the vehicle air conditioning controller can accurately infer the positions of the faces of occupants with diverse physiques. As a result, the vehicle air conditioning controller can change the direction of the conditioned air in accordance with the occupant's physique to enhance comfort when the occupant applies makeup around her/his eyes.

As described above, according to the vehicle air conditioning controller pertaining to the first aspect, comfort when the occupant applies makeup in the cabin can be enhanced in consideration of the conditioned air supplied to the cabin from the air conditioning system.

According to the vehicle air conditioning controller pertaining to the second aspect, the airflow resulting from the conditioned air can be optimized in accordance with the area to which the occupant is applying makeup.

According to the vehicle air conditioning controller pertaining to the third aspect and the fourth aspect, comfort when the occupant applies makeup around her/his eyes can be enhanced.

According to the vehicle air conditioning controller pertaining to the fifth aspect, makeup applied around the eyes can be inhibited from running.

According to the vehicle air conditioning controller pertaining to the sixth aspect, an occupant riding in the same vehicle but not applying makeup can also stay comfortable.

According to the vehicle air conditioning controller pertaining to the seventh aspect, whether or not the occupant is applying makeup can be easily determined based on the movements of the occupant starting to apply makeup in the cabin of the vehicle.

According to the vehicle air conditioning controller pertaining to the eighth aspect, the vehicle air conditioning controller can accurately determine whether or not the occupant is applying makeup and, in a case in which the occupant is applying makeup to an area largely unaffected by the conditioned air, can maintain the temperature in the cabin at a comfortable level without restricting the conditioned air.

According to the vehicle air conditioning controller pertaining to the ninth aspect, the vehicle air conditioning controller can change the direction of the conditioned air in accordance with the occupant's physique to enhance comfort when the occupant applies makeup around the eyes.

BRIEF DESCRIPTION OF THE DRAWINGS

An exemplary embodiment of the present disclosure will be described in detail based on the following figures, wherein.

DETAILED DESCRIPTION

Figure 1:
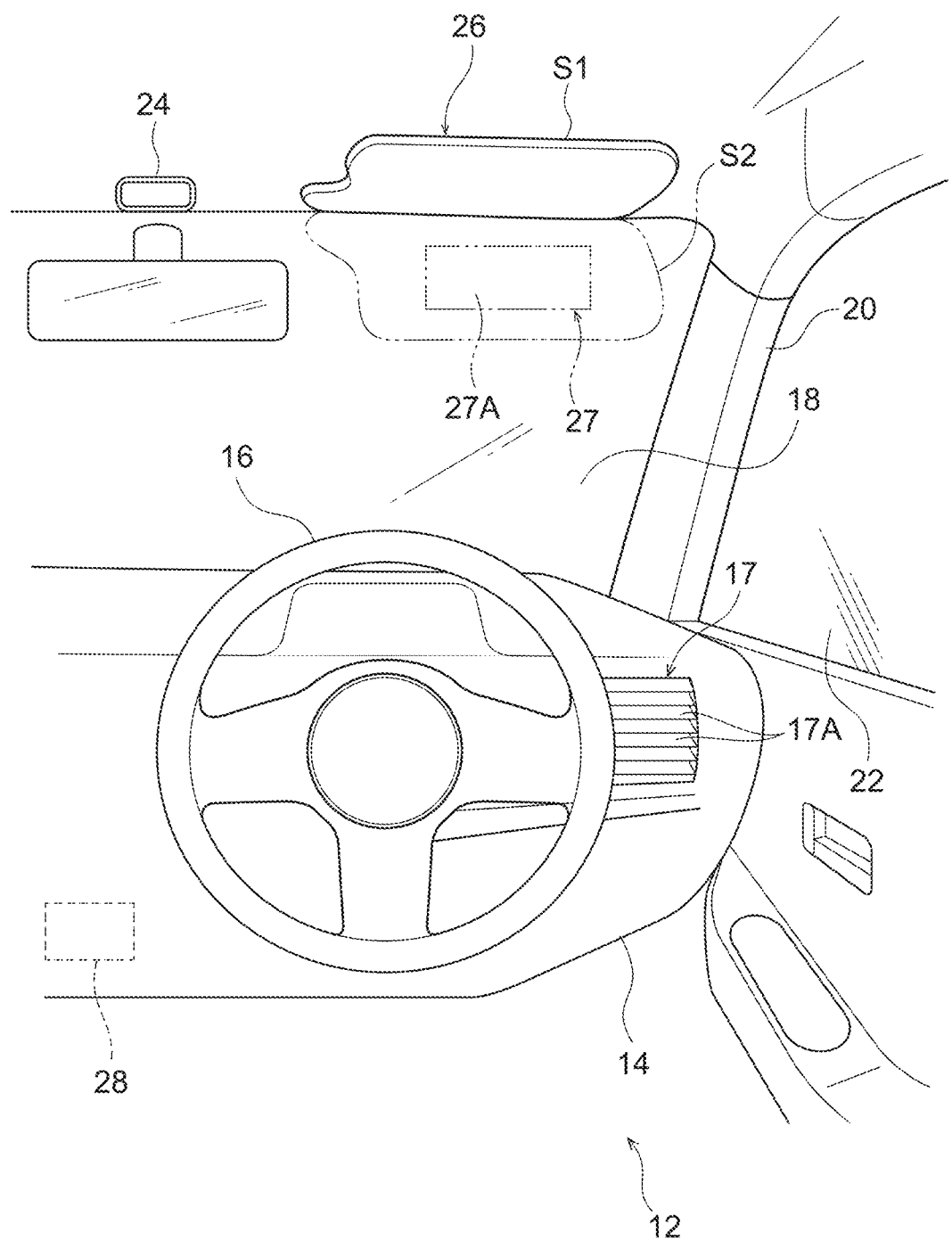
FIG. 1 is a general view, seen from a vehicle rear direction, of a front portion of a cabin in a vehicle to which a vehicle air conditioning controller pertaining to the embodiment has been applied.

A vehicle 12 to which a vehicle air conditioning controller 10 pertaining to an embodiment has been applied will be described with reference to the drawings. It will be noted that in FIG. 7A and FIG. 7B arrow UP indicates a vehicle upward direction and arrow FR indicates a vehicle forward direction. Furthermore, when just the expressions "front," "rear," "left," and "right" are given below, these are intended to mean front or rear in the vehicle front and rear direction and left or right in the vehicle width direction. As shown in FIG. 1, the vehicle 12 has a cabin, and an instrument panel 14 is provided in the front portion of the cabin.

The instrument panel 14 extends in the vehicle width direction, and a steering wheel 16 is provided on the vehicle right side of the instrument panel 14. That is, in this embodiment, as an example, the vehicle 12 is configured to be a right-hand drive car in which the steering wheel 16 is provided on the right side, with the driver's seat being set on the vehicle right side.

Figure 2:
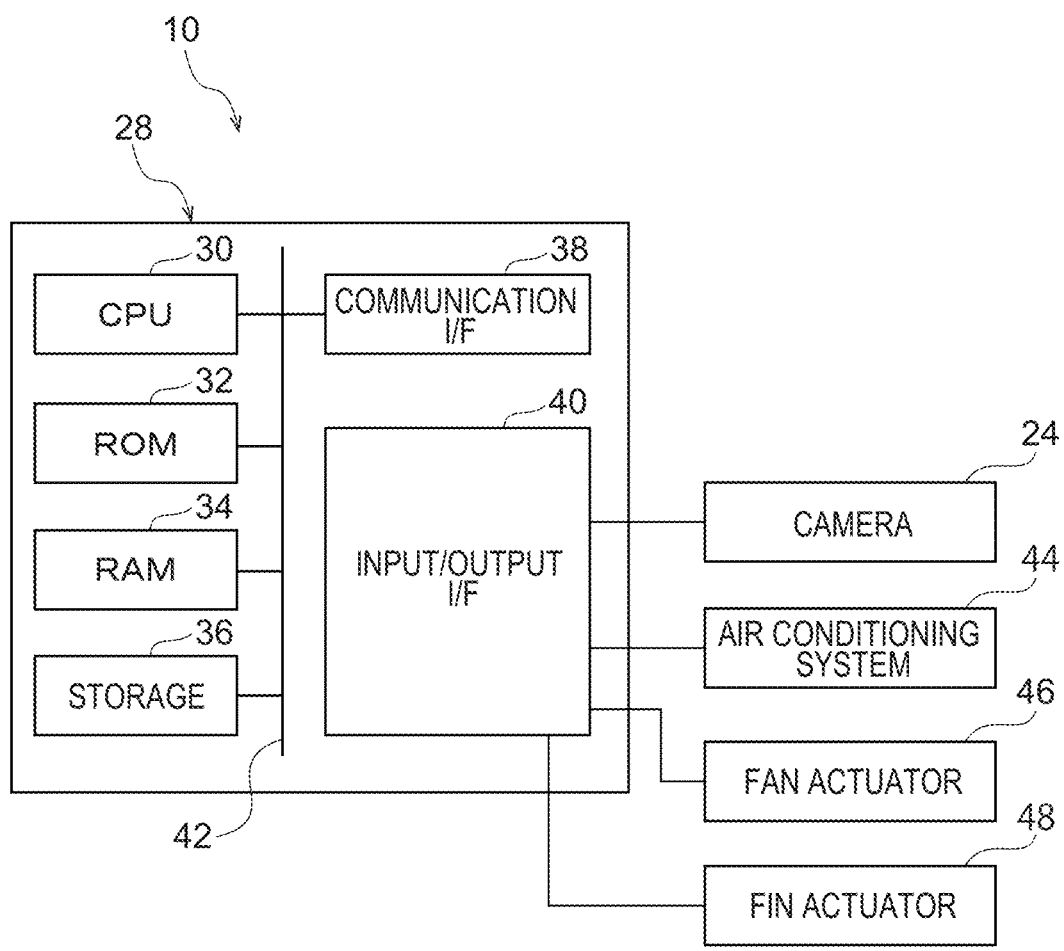
FIG. 2 is a block diagram showing hardware configurations of the vehicle air conditioning controller pertaining to the embodiment.

Furthermore, to the right of the steering wheel 16 in the instrument panel 14, an air outlet 17 is provided in correspondence to an air conditioning system 44 (see FIG. 2). The air outlet 17 is coupled, via a duct not shown in the drawings, to the air conditioning system 44 installed at the vehicle. Conditioned air such as cool air or warm air generated by the air conditioning system 44 is supplied through the air outlet 17 to the inside of the cabin.

A windshield glass 18 is provided on the front end portion of the instrument panel 14. The windshield glass 18 extends in the vehicle up and down direction and the vehicle width direction and partitions the inside of the cabin from the outside of the cabin.

The vehicle right-side end portion of the windshield glass 18 is secured to a front pillar 20 on the vehicle right side. The front pillar 20 extends in the vehicle up and down direction, and the windshield glass 18 is secured to the vehicle width direction inner end portion of the front pillar 20. Furthermore, the front end portion of a front side glass 22 is secured to the vehicle width direction outer end portion of the front pillar 20. It will be noted that the vehicle left-side end portion of the windshield glass 18 is secured to a front pillar on the vehicle left side not shown in the drawings.

Here, a camera 24 and a sun visor 26 are provided side by side in the left and right direction on the front end portion of a roof (not assigned a reference sign) configuring a ceiling of the cabin. The camera 24 corresponds to a "first camera" and a "second camera" of the disclosure. The camera 24 is mounted to the vehicle width direction center portion of the roof and is provided so as to be capable of capturing occupants sitting in the driver's seat and the front passenger seat. It will be noted that the camera 24 may also be disposed individually in front of the driver's seat and in front of the front passenger seat.

The sun visor 26 is provided on the vehicle width direction right side and left side of the roof, and is disposed in front of and above the driver's seat and the front passenger seat. The sun visor 26 is configured by a substantially rectangular tabular member, and one end of its outer peripheral portion is pivotably supported by a hinge member secured to the roof. Because of this, the sun visor 26 is configured to be displaceable between a storage position S1, in which it is disposed partially covering the roof, and a use position S2, in which the other end of the sun visor 26 is tilted downward so that the sun visor 26 hangs down from the roof.

In the state in which the sun visor 26 is disposed in the use position S2, a mirror 27 is disposed opposing the face of the occupant. A cover 27A that can be opened and closed is attached to the mirror side of the mirror 27. The occupant, by opening the cover 27A of the mirror 27, can apply makeup while checking her/his own face in the mirror of the mirror 27. It will be noted that, in the present embodiment, the state in which the cover 27A of the mirror 27 is open is a state in which the mirror 27 is in use, and the state in which the cover 27A of the mirror 27 is closed is a state in which the mirror 27 is not in use.

(Hardware Configurations of Vehicle Air Conditioning Controller 10)

The vehicle 12 is provided with an electronic control unit (ECU) 28 serving as a control unit. FIG. 2 is a block diagram showing hardware configurations of the vehicle air conditioning controller 10. As shown in FIG. 2, the ECU 28 of the vehicle air conditioning controller 10 is configured to include a central processing unit (CPU; processor) 30, a read-only memory (ROM) 32, a random-access memory (RAM) 34, a storage 36, a communication interface 38, and an input/output interface 40. These configurations are communicably connected to each other via a bus 42.

The CPU 30 is a central processing unit, executes various types of programs, and controls each part of the ECU 28. That is, the CPU 30 reads programs from the ROM 32 or the storage 36 and executes the programs using the RAM 34 as a workspace. The CPU 30 controls the above configurations and performs various types of processing in accordance with the programs recorded in the ROM 32 or the storage 36.

The ROM 32 stores various types of programs and various types of data. The RAM 34 temporarily stores programs or data as a workspace. The storage 36 is configured by a hard disk drive (HDD) or a solid-state drive (SSD) and stores various types of programs, including an operating system, and various types of data. In this embodiment, a program for performing an air conditioning control process and various types of data are stored in the ROM 32 or the storage 36.

The communication interface 38 is an interface that allows the vehicle air conditioning controller 10 to communicate with a server and other devices not shown in the drawings. The communication interface 38 uses a standard such as Ethernet (registered trademark), LTE, FDDI, or Wi-Fi (registered trademark), for example.

Connected to the input/output interface 40 are the camera 24 that captures an image of an occupant in the cabin, the air conditioning system 44, a fan actuator 46, and a fin actuator 48. The fan actuator 46 controls a blower fan (not shown in the drawings) for blowing the conditioned air generated by the air conditioning system 44. The fan actuator 46 is configured to increase and decrease the air volume of the conditioned air supplied from the air outlet 17 by controlling the blower fan. The fin actuator 48 controls, in the up/down and left/right directions, the direction in which fins 17A (see FIG. 1) provided in the air outlet 17 point. The fin actuator 48 is configured to change the air direction of the conditioned air supplied from the air outlet 17 by controlling the direction in which the fins 17A point.

(Functional Configurations of Vehicle Air Conditioning Controller 10)

The vehicle air conditioning controller 10 realizes various types of functions using the hardware resources described above. Functional configurations realized by the vehicle air conditioning controller 10 will now be described with reference to FIG. 3.

Figure 3:
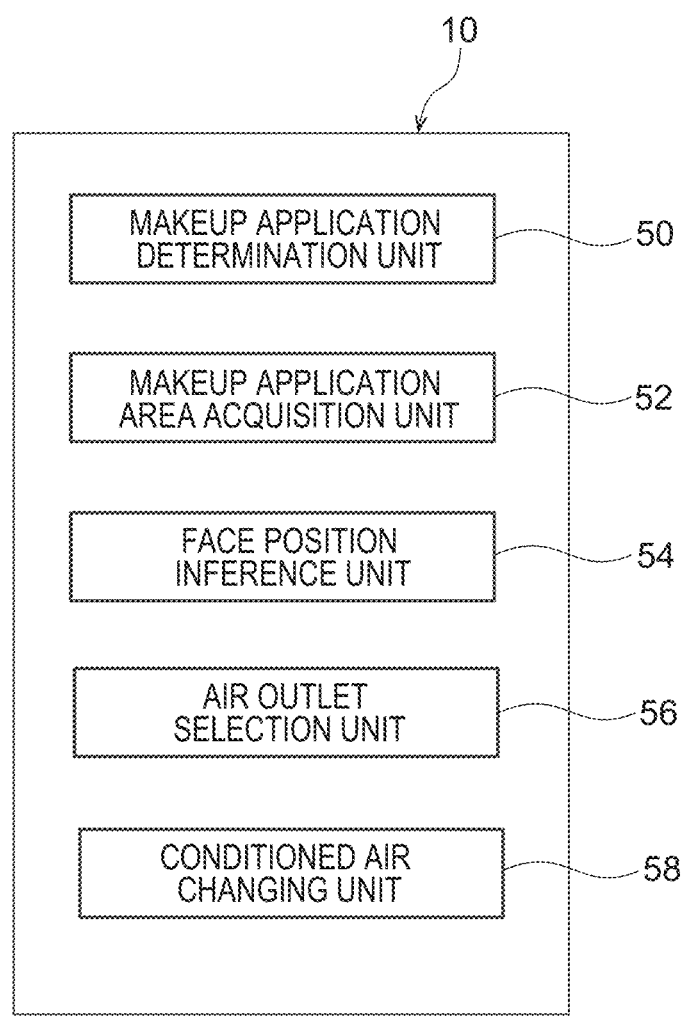
FIG. 3 is a block diagram showing functional configurations of the vehicle air conditioning controller pertaining to the embodiment.

As shown in FIG. 3, the vehicle air conditioning controller 10 is configured to include, as functional configurations, a makeup application determination unit 50, a makeup application area acquisition unit 52, a face position inference unit 54, an air outlet selection unit 56, and a conditioned air changing unit 58. It will be noted that these functional configurations are realized as a result of the CPU 30 reading and executing the program stored in the ROM 32 or the storage 36.

The makeup application determination unit 50 has the function of determining whether or not the occupant in the cabin of the vehicle 12 is applying makeup. As an example, the makeup application determination unit 50 acquires the image captured by the camera 24 and determines, based on the image that has been acquired, whether or not the occupant is applying makeup.

Specifically, the makeup application determination unit 50 discriminates, from video captured by the camera 24, makeup tools the occupant is using and discriminates, in accordance with the type of makeup tool that has been discriminated, which area of the face, from around the mouth, around the eyes, and another area of the face overall, the occupant is applying makeup to. The function of the makeup application determination unit 50 will now be specifically described with reference to FIG. 4 to FIG. 6.

Figure 4:
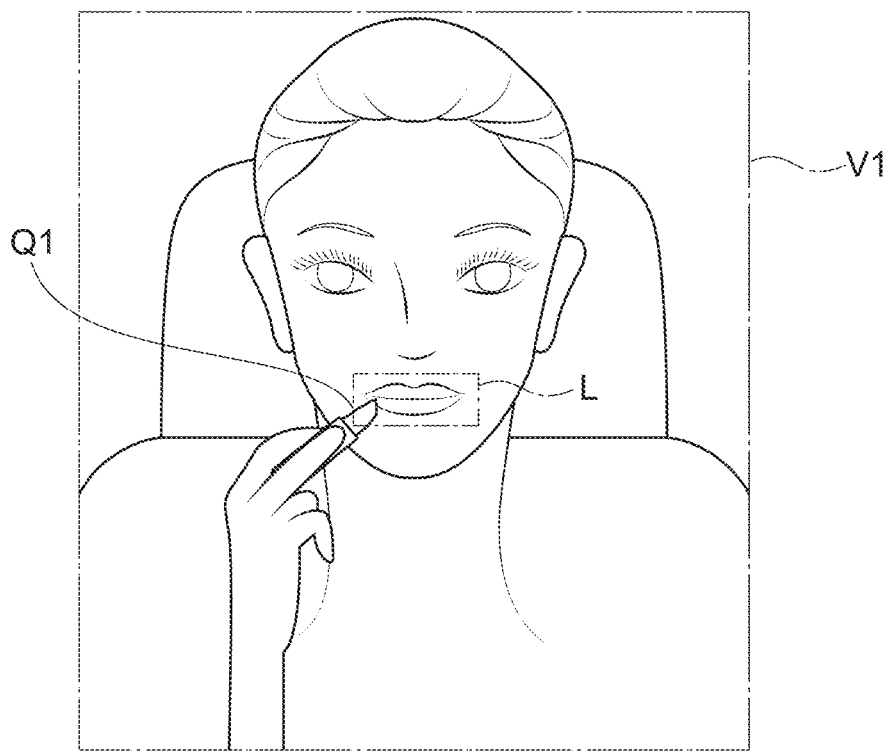
FIG. 4 shows an example of a video captured by a camera in the cabin.
Figure 5:
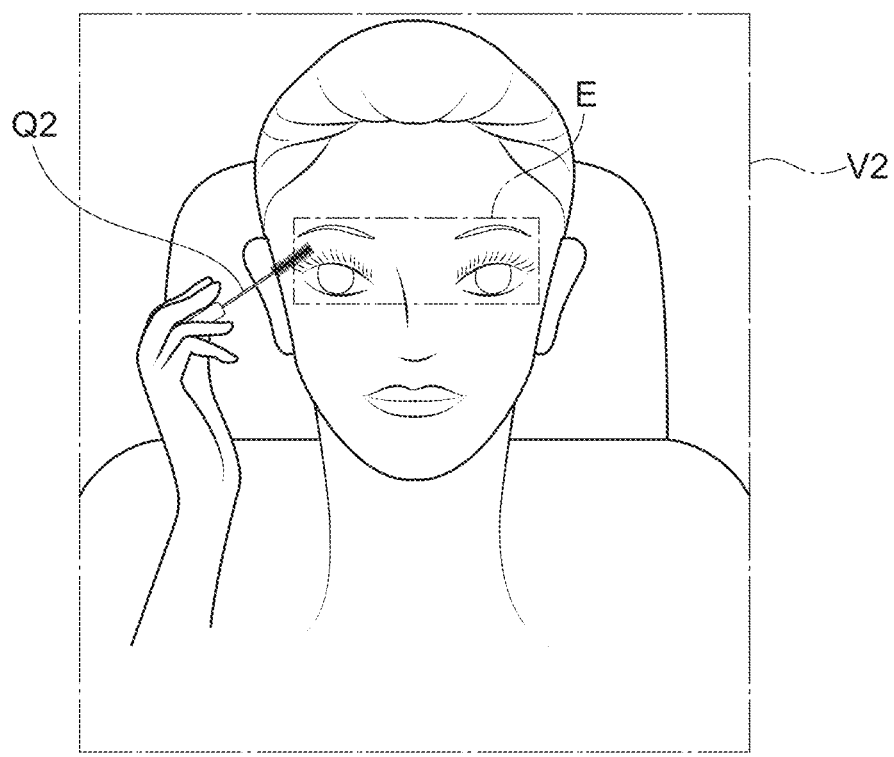
FIG. 5 shows an example of a video captured by the camera in the cabin.
Figure 6:
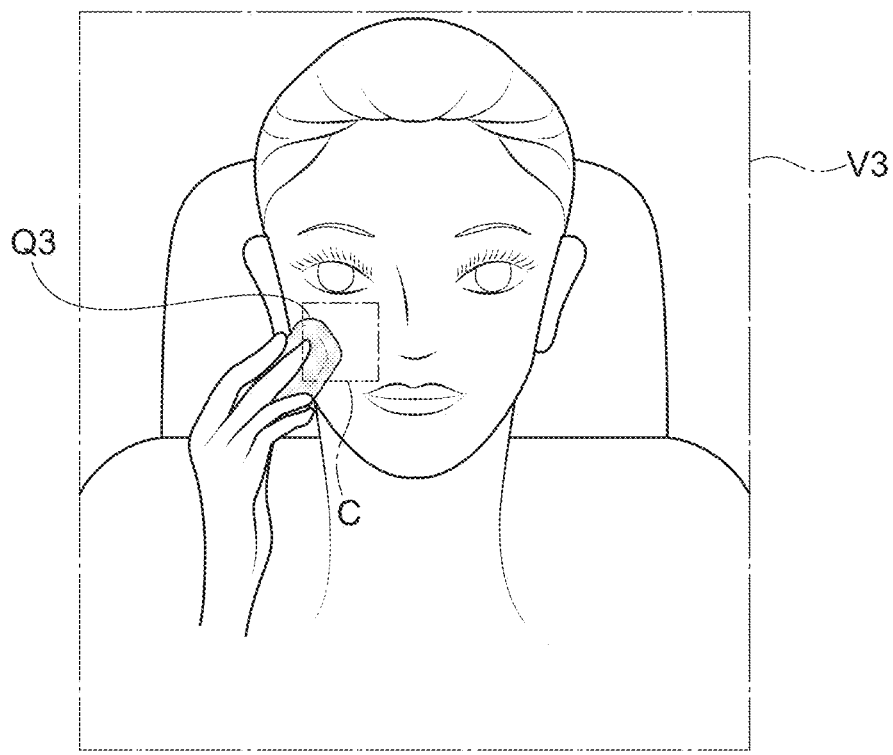
FIG. 6 shows an example of a video captured by the camera in the cabin.

FIG. 4 to FIG. 6 show examples of videos captured by the camera 24. For example, based on an image V1 shown in FIG. 4, the makeup application determination unit 50 discriminates that a makeup tool Q1 the occupant is using is a tube of lipstick. Moreover, the makeup application determination unit 50 determines that the occupant is applying makeup around her/his lips when it discriminates that at least part of the makeup tool Q1 is disposed in a region L around the mouth corresponding to lipstick. It will be noted that the makeup application determination unit 50 may also just determine that the occupant is applying makeup around her/his mouth in a case where it has discriminated that the makeup tool Q1 is a tube of lipstick. Furthermore, the makeup application determination unit 50 may also determine that the occupant is applying makeup around her/his mouth in a case where it has determined that the region in which the tube of lipstick is disposed is in a predetermined region near the occupant's face. Furthermore, that the makeup tool Q1 is a tube of lipstick is merely an example, and the makeup tool Q1 may also be a lip liner pencil or a lip brush.

Likewise, based on an image V2 shown in FIG. 5, the makeup application determination unit 50 discriminates that a makeup tool Q2 the occupant is using is a mascara wand. Moreover, the makeup application determination unit 50 discriminates that the occupant is applying makeup around her/his eyes in a case where it has discriminated that at least part of the makeup tool Q2 is disposed in a region E around the eyes corresponding to mascara. It will be noted that the makeup application determination unit 50 may also just determine that the occupant is applying makeup around her/his eyes in a case where it has discriminated that the makeup tool Q2 is a mascara wand. Furthermore, the makeup application determination unit 50 may also determine that the occupant is applying makeup around her/his eyes in a case where it has determined that the region in which the mascara wand is disposed is in a predetermined region near the occupant's face. Furthermore, that the makeup tool Q2 is a mascara wand is merely an example, and the makeup tool Q2 may also be an eyeliner pencil or an eyebrow pencil.

Likewise, based on an image V3 shown in FIG. 6, the makeup application determination unit 50 discriminates that a makeup tool Q3 the occupant is using is a sponge. Moreover, the makeup application determination unit 50 determines that the occupant is applying makeup to another area of the face overall excluding around the mouth and around the eyes in a case where it has discriminated that at least part of the makeup tool Q3 is disposed in a region C of the face—excluding regions L and E around the mouth and around the eyes—corresponding to the sponge. It will be noted that the makeup application determination unit 50 may also just determine that the occupant is applying makeup to another area of the face overall excluding around the mouth and around the eyes in a case where it has discriminated that the makeup tool Q3 is a sponge. Furthermore, the makeup application determination unit 50 may also determine that the occupant is applying makeup to another area of the face overall excluding the mouth and around the eyes in a case where it has determined that the region in which the sponge is disposed is in a predetermined region near the occupant's face. Furthermore, that the makeup tool Q3 is a sponge is merely an example, and the makeup tool Q3 may also be a face brush or a cheek brush.

The makeup application area acquisition unit 52 acquires information relating to the area to which the occupant is applying makeup based on the result of the determination by the makeup application determination unit 50.

The face position inference unit 54 infers the position of the occupant's face. As an example, the face position inference unit 54 discriminates the occupant's eyes based on the image of the occupant's face captured by the camera 24 shown in FIG. 4, etc., and infers the position of the occupant's face based on the position of the eyes that have been discriminated.

It will be noted that the above-described inference method in this embodiment is merely an example, and other inference methods can also be used. For example, the face position inference unit 54 may also infer that the position of a headrest 110 of a vehicle seat 100 (see FIG. 7A and FIG. 7B) in which the occupant is sitting is the position of the occupant's face. Alternatively, a pressure-sensitive sensor may be provided in the vehicle seat, and the face position inference unit 54 may infer the position of the occupant's face in consideration of the pressure distribution on the vehicle seat.

The air outlet selection unit 56 selects, from among a plurality of air outlets 17 provided in the cabin, a predetermined air outlet 17 disposed in front of the occupant applying makeup. Specifically, the air outlet selection unit 56 identifies the occupant applying makeup based on the result of the determination by the makeup application determination unit 50 and selects a predetermined air outlet 17 disposed in front of the position where the occupant is sitting.

The conditioned air changing unit 58 has the function of changing at least one of the air direction and the air volume of the conditioned air supplied to the occupant from the air outlet 17. In this embodiment, in a case where the makeup application determination unit 50 has determined that a predetermined occupant is applying makeup, the conditioned air changing unit 58 changes the air direction and the air volume of the conditioned air supplied from the predetermined air outlet 17 selected by the air outlet selection unit 56.

More specifically, the conditioned air changing unit 58 changes, in accordance with the area to which the occupant is applying makeup, the air conditioning state in the cabin to either one of two air conditioning states described below.

(First Air Conditioning State)

Figure 7A:
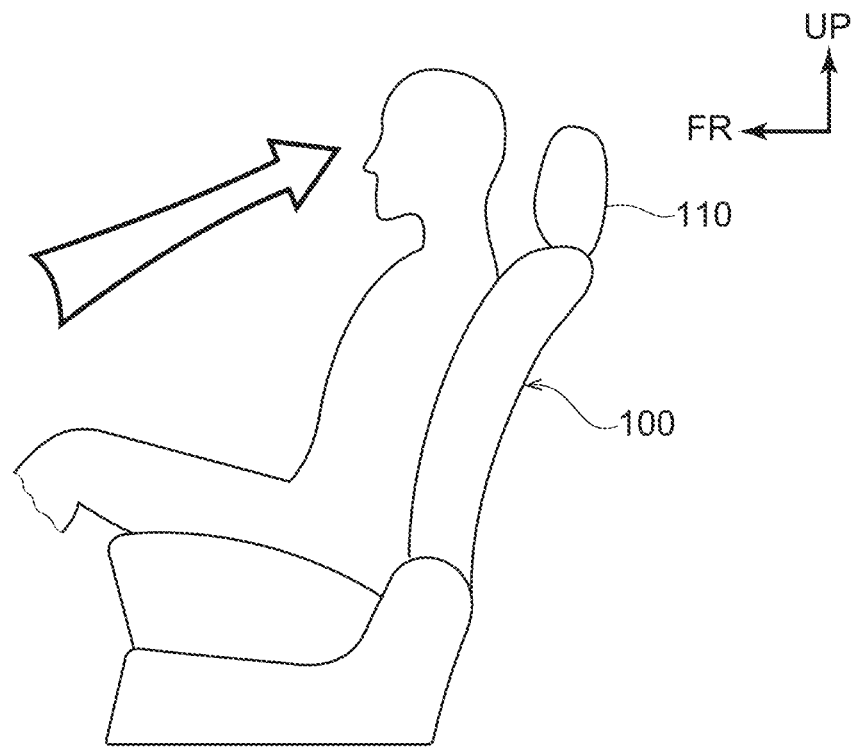
FIG. 7A shows an example of a state before the air direction and the air volume of conditioned air supplied to an occupant in the cabin of the vehicle are changed.
Figure 7B:
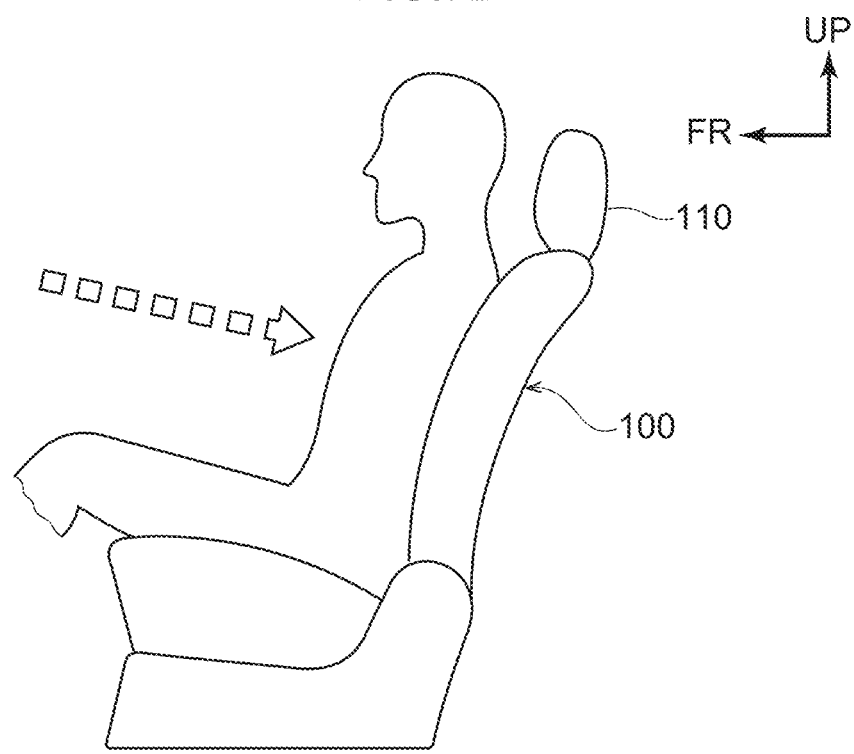
FIG. 7B shows an example of a state after the air direction and the air volume of the conditioned air supplied to the occupant in the cabin of the vehicle have been changed.

FIG. 7A and FIG. 7B are schematic drawings, seen from the side, of an occupant sitting in the vehicle seat 100 which is the driver's seat of the vehicle 12. As shown in these drawings, in a case where the makeup application determination unit 50 has determined that the occupant is applying makeup to an area other than around her/his eyes (around the mouth and another area of the face overall excluding around the mouth and around the eyes), the conditioned air changing unit 58 changes the air conditioning state from a state prior to being changed shown in FIG. 7A to a first air conditioning state shown in FIG. 7B. In the first air conditioning state, the conditioned air changing unit 58 changes, with the fin actuator 48, the inclination of the fins 17A to thereby change the direction of the conditioned air to a direction that avoids the position of the occupant's face inferred by the face position inference unit 54. Furthermore, the conditioned air changing unit 58 decreases the rotational speed of the fan actuator 46 to thereby reduce the air volume of the conditioned air supplied from the air outlet 17. It will be noted that the configuration of the first air conditioning state is not limited to this and can be appropriately changed. For example, the conditioned air changing unit 58 may also change one of the air direction and the air volume of the conditioned air.

(Second Air Conditioning State)

In a case where the makeup application determination unit 50 has determined that the occupant is applying makeup around her/his eyes, the conditioned air changing unit 58 changes at least one of the air direction and the air volume of the conditioned air supplied from the air outlet 17 to thereby change the air conditioning state from the first air conditioning state to a second air conditioning state. In the second air conditioning state, the conditioned air supplied to the occupant is restricted compared to the first air conditioning state. In this embodiment, for example, in the second air conditioning state, the air volume of the conditioned air is reduced compared to the first air conditioning state. It will be noted that in the second air conditioning state the conditioned air changing unit 58 may also be configured to stop the supply of the conditioned air or may change the direction of the conditioned air to a direction away from the occupant's face compared to the direction in the first air conditioning state.

(Action)

Next, the action of this embodiment will be described.

(Makeup Application Assist Process)

An example of an air conditioning control process that controls the conditioned air in consideration of an occupant applying makeup in the cabin of the vehicle 12 will now be described using the flowchart shown in FIG. 8. The air conditioning control process is executed as a result of the CPU 30 reading the program from the ROM 32 or the storage 36, transferring it to the RAM 34, and executing it.

Figure 8:
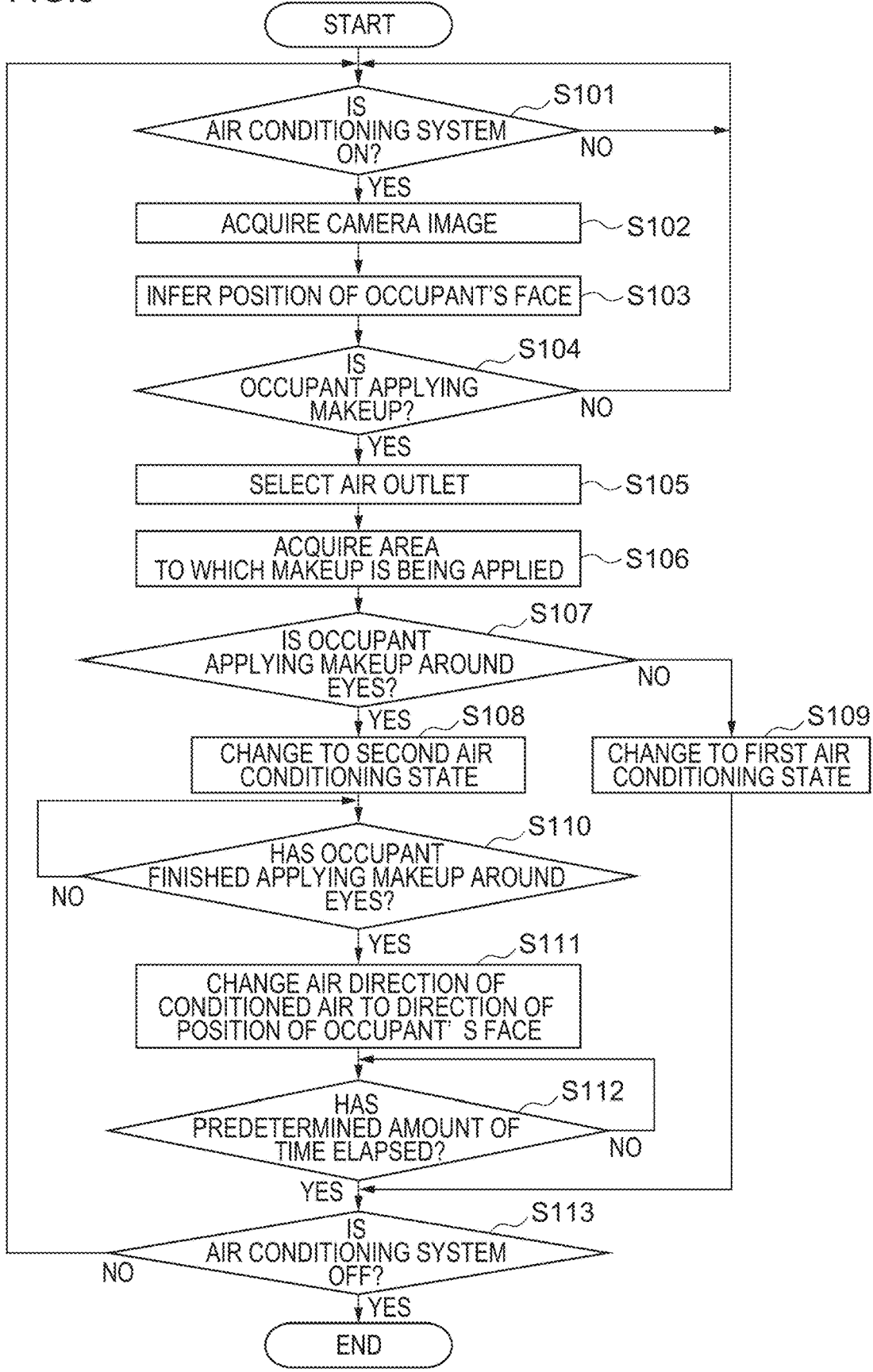
FIG. 8 is a flowchart showing an example of an air conditioning control process in the embodiment.

As shown in FIG. 8, in step S101 the CPU 30 judges whether or not the air conditioning system 44 is on (activated).

The CPU 30 moves to the process of step S102 when it judges in step S101 that the air conditioning system 44 is on. Furthermore, the CPU 30 repeats the process of step S101 when it judges in step S102 that the air conditioning system 44 is not on.

In step S102 the CPU 30 acquires the image captured by the camera 24, and then the CPU 30 moves to the process of step S103.

In step S103 the CPU 30 infers the position of the occupant's face. Specifically, the CPU 30 infers the position of the occupant's face by recognizing, based on the function of the face position inference unit 54, the position of the occupant's eyes from the image of the occupant's face captured by the camera 24. The CPU 30 thereafter moves to the process of step S104.

In step S104 the CPU 30 determines whether or not the occupant is applying makeup. Specifically, the CPU 30 determines that the occupant is applying makeup in a case where, by the function of the makeup application determination unit 50, it has judged, based on the image captured by the camera 24, that the occupant is applying makeup to any one area among areas corresponding to around the mouth, around the eyes, and another area of the face overall excluding around the mouth and around the eyes.

The CPU 30 moves to the process of step S105 when it determines in step S104 that the occupant is applying makeup. Furthermore, the CPU 30 returns to step S101 and repeats the process when it judges in step S104 that the occupant is not applying makeup.

In step S105 the CPU 30 selects, from among the plurality of air outlets 17 provided in the cabin, a predetermined air outlet 17 disposed in front of the occupant applying makeup. The CPU 30 thereafter moves to the process of step S106.

In step S106 the CPU 30 acquires, based on the function of the makeup application area acquisition unit 52, the area to which the occupant is applying makeup, and then the CPU 30 moves to the process of step S107.

In step S107 the CPU 30 judges whether or not the occupant is applying makeup around her/his eyes. Specifically, the CPU 30 judges that the occupant is applying makeup around her/his eyes in a case where, based on the function of the makeup application area acquisition unit 52, information indicating that the area to which the occupant is applying makeup is around her/his eyes has been acquired.

The CPU 30 moves to the process of step S108 when it judges in step S107 that the occupant is applying makeup around her/his eyes. In step S108 the CPU 30 changes the air volume and the air direction of the conditioned air to thereby change the cabin to the second air conditioning state. The CPU 30 thereafter moves to the process of step S110.

In a case where the CPU 30 has judged in step S107 that the occupant is applying makeup to an area other than around her/his eyes (around the mouth or another area of the face overall), the CPU 30 moves to the process of step S109, where it changes the air volume and the air direction of the conditioned air to thereby change the cabin to the first air conditioning state. The CPU 30 thereafter moves to the process of step S113.

In step S110 the CPU 30 judges whether or not the occupant has finished applying makeup around her/his eyes. Specifically, the CPU 30 judges that the occupant has finished applying makeup around her/his eyes in a case where, based on the function of the makeup application area acquisition unit 52, it has been judged that the occupant is applying makeup to an area other than around her/his eyes (around the mouth or another area of the face overall) or in a case where it is judged that the occupant is not applying makeup.

The CPU 30 moves to the process of step S111 in a case where it has judged in step S110 that the occupant has finished applying makeup around her/his eyes. Furthermore, the CPU 30 repeats the process of step S110 in a case where it has judged in step S110 that the occupant has not finished applying (is continuing to apply) makeup around her/his eyes.

In step S111 the CPU 30 changes the air direction of the conditioned air to the direction of the position of the occupant's face. Specifically, based on the function of the conditioned air changing unit 58, the CPU 30 changes the direction in which the fins 17A of the air outlet 17 point to thereby change the direction of the conditioned air to the direction of the occupant's face inferred by the face position inference unit 54. The CPU 30 thereafter moves to the process of step S112.

In step S112 the CPU 30 judges whether or not a predetermined amount of time has elapsed since changing the direction of the conditioned air to the direction of the position of the occupant's face. Specifically, the CPU 30 activates a timer in the process of step S111 and judges whether or not the predetermined amount of time has elapsed since activating the timer. The CPU 30 moves to the process of step S113 in a case where it has judged in step S112 that the predetermined amount of time has elapsed. Furthermore, the CPU 30 repeats the process of step S112 in a case where it has judged in step S112 that the predetermined amount of time has not elapsed.

In step S113 the CPU 30 judges whether or not the air conditioning system 44 is off (stopped). The CPU 30 ends the process in a case where it has judged in step S113 that the air conditioning system 44 is off. Furthermore, the CPU 30 returns to step S101 and repeats the process in a case where it has judged in step S113 that the air conditioning system 44 is not off.

The vehicle air conditioning controller 10 of this embodiment described above determines whether or not the occupant in the cabin of the vehicle 12 is applying makeup. The vehicle air conditioning controller 10, in a case where it has determined that the occupant is applying makeup, changes at least one of the air direction and the air volume of the conditioned air supplied to the occupant from the air outlet 17 provided in the cabin. In one example of this embodiment, the vehicle air conditioning controller 10 changes both the air direction and the air volume of the conditioned air and restricts the conditioned air supplied toward the occupant. Because of this, the vehicle air conditioning controller 10 can reduce annoyance felt by the occupant applying makeup because of the conditioned air, and can enhance comfort when the occupant applies makeup in the cabin of the vehicle 12.

Furthermore, in this embodiment, the vehicle air conditioning controller 10 can change the air direction and/or the air volume of the conditioned air can be changed in accordance with the area to which the occupant is applying makeup, so it can optimize, in accordance with the area to which the occupant is applying makeup, the airflow resulting from the conditioned air.

Furthermore, in this embodiment, when the occupant is applying makeup around her/his eyes, the air conditioning state in the cabin is changed from the first air conditioning state, which is set in a case where the occupant is applying makeup to another area of her/his face, to the second air conditioning state. In the second air conditioning state, the conditioned air supplied to the occupant applying makeup is restricted compared to the first air conditioning state. Consequently, by sufficiently restricting the conditioned air flowing toward the occupant when the occupant is applying makeup around her/his eyes, which the occupant cannot blink while applying makeup to them, the occupant's eyes can be prevented from being dried out. Furthermore, liquid makeup used around the eyes, such as mascara, can be inhibited from being dried out. Because of this, comfort when the occupant applies makeup around her/his eyes can be enhanced.

Furthermore, the vehicle air conditioning controller 10 of this embodiment is configured to be capable of inferring the position of the occupant's face. The vehicle air conditioning controller 10, by changing the cabin to the second air conditioning state when the occupant applies makeup around her/his eyes, changes the air direction of the conditioned air supplied to the occupant to a direction that avoids the position of the occupant's face that has been inferred. Because of this, the conditioned air is kept from being directly blown onto the occupant's face, so the occupant's eyes can be effectively inhibited from being dried out and makeup can be effectively inhibited from being scattered and dried out. As a result, comfort when the occupant applies makeup around her/his eyes can be enhanced.

Furthermore, in this embodiment, the vehicle air conditioning controller 10, in a case where it has judged that the occupant has finished applying makeup around her/his eyes, changes the air direction of the conditioned air from the direction of the second air conditioning state that avoids the position of the occupant's face to the direction of the position of the occupant's face. Because of this, the conditioned air is supplied around the occupant's eyes after the occupant has finished applying makeup to them, and liquid makeup applied around the eyes can be efficiently dried. As a result, makeup applied around the eyes can be inhibited from running.

Furthermore, in this embodiment, the vehicle air conditioning controller 10, when the occupant applies makeup, selects, from among the plurality of air outlets 17 provided in the cabin, a predetermined air outlet 17 disposed in front of the occupant and changes at least one of the air direction and the air volume of the conditioned air supplied from the predetermined air outlet 17. Because of this, the vehicle air conditioning controller can distinguish between and perform air conditioning with respect to an occupant not applying makeup and air conditioning with respect to an occupant applying makeup. As a result, another occupant not applying makeup can stay comfortable without the air conditioning being restricted.

Furthermore, in this embodiment, the vehicle air conditioning controller 10 determines whether or not the occupant is applying makeup based on the image of the occupant's face captured by the camera 24, so it can grasp in detail the actions of the occupant and can accurately determine whether or not the occupant is applying makeup. Furthermore, the vehicle air conditioning controller 10 determines that the occupant is applying makeup only in a case where it has determined that the occupant is applying makeup to a predetermined area of her/his face. That is, the vehicle air conditioning controller 10 judges that the occupant is applying makeup in a case where it has been judged that the occupant, meeting a predetermined condition, is applying makeup around the mouth, around the eyes, or another area corresponding to the face overall. Consequently, for example, in a case where the occupant is applying makeup to an area largely unaffected by the conditioned air, the temperature in the cabin can be maintained at a comfortable level without restricting the conditioned air.

Furthermore, in this embodiment, the vehicle air conditioning controller 10 infers the position of the occupant's face by recognizing, based on the image of the occupant's face captured by the camera 24, the position of the occupant's eyes. Because of this, the vehicle air conditioning controller 10 can accurately infer the positions of the faces of occupants with diverse physiques. As a result, the vehicle air conditioning controller 10 can change the direction of the conditioned air in accordance with the occupant's physique to enhance comfort when the occupant applies makeup around her/his eyes.

First Example Modification

In this connection, the function of the makeup application determination unit 50 of the above embodiment is configured to judge, based on the image captured by the camera 24, whether or not the occupant is applying makeup, but the disclosure is not limited to this. For example, the makeup application determination unit 50 may also be configured to judge that the occupant is applying makeup in a case where the mirror 27 of the sun visor 26 shown in FIG. 1 is in use. In this case, the conditioned air is automatically changed when the occupant starts to use the mirror 27 of the sun visor 26 to apply makeup. In this way, whether or not the occupant is applying makeup can be easily determined based on the movements of the occupant starting to apply makeup in the cabin of the vehicle 12.

It will be noted that the makeup application determination unit may also be configured to determine that the occupant is applying makeup in accordance with a voluntary operation by the occupant. For example, the makeup application determination unit may be configured to judge, as a result of the occupant performing a predetermined operation on an operation unit of the vehicle, that the occupant is applying makeup and/or the area to which the occupant is applying makeup.

Second Example Modification

Figure 9:
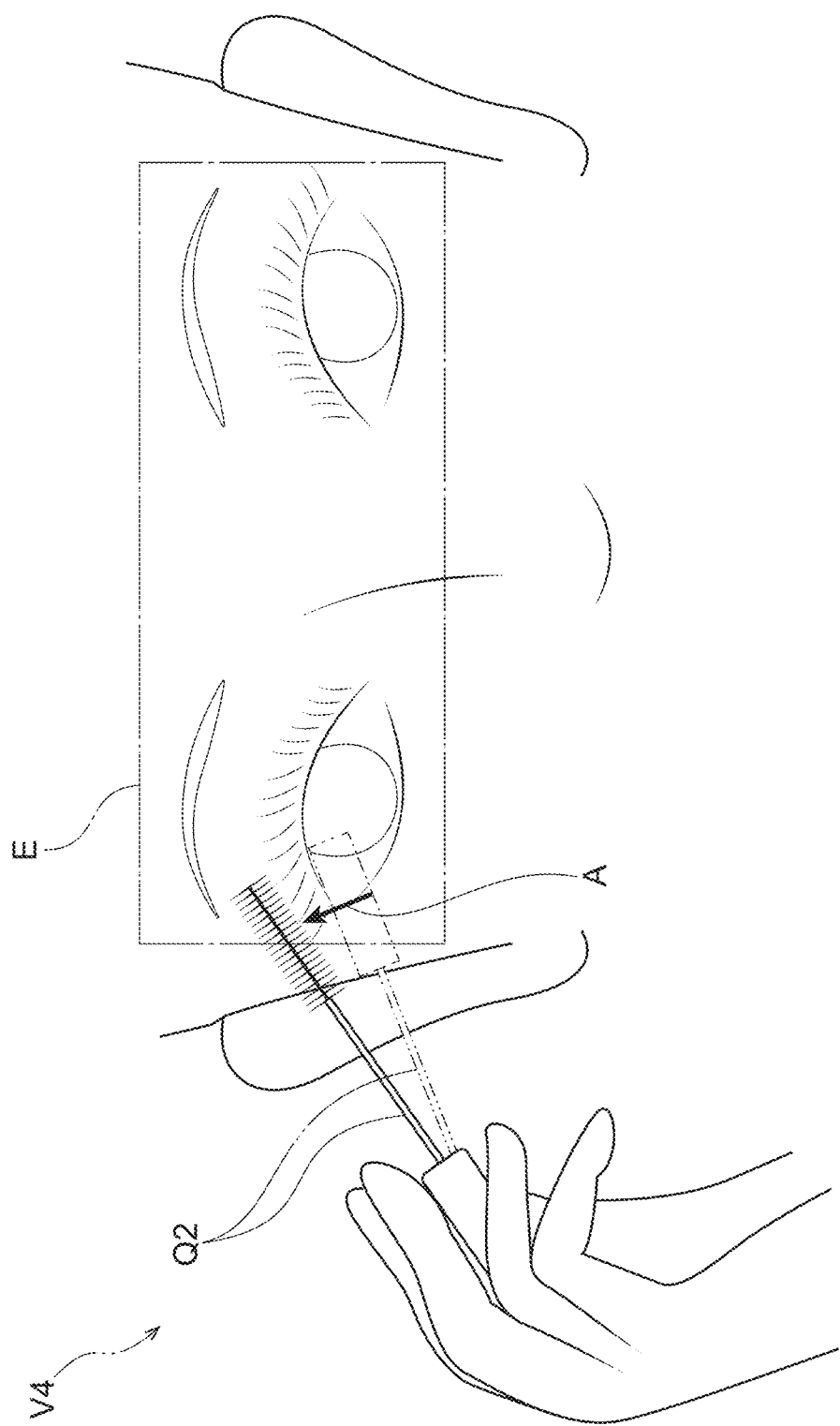
FIG. 9 is a drawing for describing a second example modification of the embodiment.

Furthermore, according to the function of the makeup application determination unit 50 of the above embodiment, the makeup application determination unit 50 is configured to discriminate the type of makeup tool the occupant is using and judge that the occupant is applying makeup based on the image captured by the camera 24, but the disclosure is not limited to this. The makeup application determination unit 50 may also be configured, as in a second example modification of the embodiment shown in FIG. 9, to determine, based on the moving speed at which the occupant's fingertips or the makeup tools the occupant is using move over a predetermined area of the occupant's face based on the image captured by the camera 24, whether or not the occupant is applying makeup to the predetermined area. FIG. 9 partially shows an image V4 as an example of the image of the occupant's face captured by the camera 24, and the makeup tool Q2 the occupant is using in the region E around her/his eyes is a mascara wand. Furthermore, the moving speed of the distal end side of the mascara wand is schematically indicated by arrow A. In this second example modification, in a case where the moving speed A of the makeup tool Q2 is less than a predetermined threshold, it is judged that the action performed by the occupant is the action of applying makeup, and the makeup application determination unit determines that the occupant is applying makeup. In a case where the moving speed A of the occupant's fingertips or the makeup tool Q2 is greater than the predetermined threshold, it is inferred that the action performed by the occupant is the action of rubbing the eyes or an action other than applying makeup, and it is judged that the occupant is not applying makeup.

According to this configuration, for example, in a case where the occupant is using her/his fingertips to apply makeup, the makeup application determination unit 50 can accurately determine that the action performed by the occupant is the action of applying makeup without erroneously discriminating it as the action of rubbing the eyes, so the precision of the makeup application determination unit can be enhanced.

Furthermore, from the perspective of similarly enhancing the determination precision of the makeup application determination unit, the makeup application determination unit may also be configured to determine, based on the trajectory along which the occupant's fingertips or the makeup tools the occupant is using move over a predetermined area of the occupant's face based on the image captured by the camera 24, whether or not the occupant is applying makeup to the predetermined area. In this case also, by discerning the difference between the moving trajectory of the fingertips in the common action of rubbing the eyes and the moving trajectory of the fingertips when applying makeup, whether or not the occupant is applying makeup can be accurately determined.

It will be noted that although in the above embodiment and the example modifications, a case where the occupant is sitting in the vehicle seat 100 which is the driver's seat is described, the disclosure is not limited to this. The occupant may also be sitting in the front passenger seat or a back seat. Furthermore, FIG. 1 shows only the air outlet 17 provided in the instrument panel 14, but the air outlet provided in the cabin of the vehicle 12 is not limited to this. For example, the air outlets of the air conditioning system may also be provided in a console box, roof side rails, and in the backs of seat backs of the front seats.

It will be noted that various types of processors other than a CPU may also execute the air conditioning control process that the CPU executed by reading software (a program) in the above embodiment. Examples of the processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the air conditioning control process may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in the above embodiment, the program for the air conditioning control process was described as being stored (installed) beforehand in the ROM or the storage, but it is not limited to this. The program may also be provided in a form in which it is recorded in a recording medium such as a compact disc read-only memory (CD-ROM), a digital versatile disc read-only memory (DVD-ROM), and a universal serial bus (USB) memory. Furthermore, the program may also take a form in which it is downloaded via a network from an external device.

What is claimed is:

1. A vehicle air conditioning controller, comprising:
a memory; and
a processor coupled to the memory, wherein
the processor
determines whether or not an occupant in a cabin of a vehicle is applying makeup and,
in a case in which it has been determined that the occupant is applying makeup, changes at least one of an air direction or an air volume of conditioned air that is generated by an air conditioning system installed at the vehicle and is supplied to the occupant from an air outlet provided in the cabin,
the processor acquires information relating to an area to which the occupant is applying makeup and changes, with reference to the acquired information, at least one of the air direction or the air volume of the conditioned air in accordance with the area to which the occupant is applying makeup, and
the processor
references the information acquired in relation to the area to which the occupant is applying makeup and,
in a case in which the area to which the occupant is applying makeup is a predetermined area other than around eyes, changes at least one of the air direction or the air volume of the conditioned air to thereby change an air conditioning state in the cabin to a first air conditioning state and,
in a case in which the area to which the occupant is applying makeup is around the eyes, changes at least one of the air direction or the air volume of the conditioned air to thereby change the cabin to a second air conditioning state in which, compared to the first air conditioning state, the conditioned air supplied to the occupant is restricted.

2. The vehicle air conditioning controller of claim 1, wherein
the processor is configured to
infer a position of the face of the occupant, and
in the second air conditioning state in the cabin, change the air direction of the conditioned air to a direction that avoids the position of the face of the occupant.

3. The vehicle air conditioning controller of claim 2, wherein
the processor is configured to,
after changing the cabin to the second air conditioning state, reference the information acquired in relation to the area to which the occupant is applying makeup, and
in response to judging that the occupant has finished applying makeup around the eyes, change the air direction of the conditioned air to a direction of the position of the face of the occupant.

4. The vehicle air conditioning controller of claim 2, wherein:
in the cabin of the vehicle, a second camera configured to capture an image of the face of the occupant is disposed, and
the processor is configured to infer the position of the face of the occupant by recognizing, based on the image captured by the second camera, a position of the eyes of the occupant.

5. The vehicle air conditioning controller of claim 1, wherein
the processor is further configured to:
acquire an image captured by a camera,
infer a position of a face of the occupant based on a position of the eyes of the occupant in the captured image,
determine whether or not the occupant is applying makeup,
in response to determining that the occupant is applying makeup,
select, from among a plurality of air outlets including the air outlet provided in the cabin, a predetermined air outlet disposed in front of the occupant applying makeup,
acquire the information relating to the area to which the occupant is applying makeup,
in response to the area to which the occupant is applying makeup is the predetermined area other than around the eyes, change the air conditioning state to the first air conditioning state by changing said at least one of the air direction or the air volume of conditioned air from the predetermined air outlet, and
in response to the area to which the occupant is applying makeup is around the eyes, change the air conditioning state to the second air conditioning state by changing said at least one of the air direction or the air volume of conditioned air from the predetermined air outlet.

6. The vehicle air conditioning controller of claim 5, wherein
the processor is further configured to
after changing the air conditioning state to the second air conditioning state, judge whether or not the occupant has finished applying makeup around the eyes, and
in response to judging that the occupant has finished applying makeup around the eyes, change the air direction of the conditioned air toward the position of the face of the occupant.

7. The vehicle air conditioning controller of claim 1, wherein
the processor is configured to, in response to determining that the occupant is applying makeup,
select, from among a plurality of air outlets including the air outlet provided in the cabin, a predetermined air outlet disposed in front of the occupant applying makeup and
change at least one of the air direction or the air volume of the conditioned air supplied to the occupant from the predetermined air outlet.

8. The vehicle air conditioning controller of claim 1, wherein:
in the cabin of the vehicle, a sun visor is disposed in front of the occupant, the sun visor including a mirror and a cover attached to a mirror side of the mirror, and
the processor is configured to
in response to the cover being open,
determine the mirror being in use, and
determine that the occupant is applying makeup, and
in response to the cover being closed,
determine the mirror being not in use, and
determine that the occupant is not applying makeup.

9. The vehicle air conditioning controller of claim 1, wherein:
in the cabin of the vehicle, a first camera configured to capture an image of a face of the occupant is disposed, and
the processor is configured to, in response to determining, based on the image captured by the first camera, that the occupant is applying makeup to a further predetermined area of the face, determine that the occupant is applying makeup.

10. A computer-readable non-transitory storage medium storing a program for causing, when executed by a processor, the processor to execute:
determining whether or not an occupant in a cabin of a vehicle is applying makeup, and
in response to determining that the occupant is applying makeup, changing at least one of an air direction or an air volume of conditioned air that is generated by an air conditioning system installed at the vehicle and is supplied to the occupant from an air outlet provided in the cabin, wherein
the program causes the processor to further execute:
acquiring information relating to an area to which the occupant is applying makeup, and
changing, with reference to the acquired information, said at least one of the air direction or the air volume of the conditioned air in accordance with the area to which the occupant is applying makeup, and
the program causes the processor to further execute:
referencing the acquired information relating to the area to which the occupant is applying makeup and,
in response to the area to which the occupant is applying makeup being a predetermined area other than around eyes, changing said at least one of the air direction or the air volume of the conditioned air to thereby change an air conditioning state in the cabin to a first air conditioning state, and
in response to the area to which the occupant is applying makeup being around the eyes, changing said at least one of the air direction or the air volume of the conditioned air to thereby change the cabin to a second air conditioning state in which, compared to the first air conditioning state, the conditioned air supplied to the occupant is restricted.

11. The computer-readable non-transitory storage medium of claim 10, wherein
in the cabin of the vehicle, a sun visor is disposed in front of the occupant, the sun visor including a mirror and a cover attached to a mirror side of the mirror, and
the program causes the processor to further execute:
in response to the cover being open,
determining the mirror being in use, and
determining that the occupant is applying makeup, and
in response to the cover being closed,
determining the mirror being not in use, and
determining that the occupant is not applying makeup.

12. The computer-readable non-transitory storage medium of claim 11, wherein
the program causes the processor to further execute:
acquiring an image captured by a camera,
inferring a position of a face of the occupant based on a position of the eyes of the occupant in the captured image,
determining whether or not the occupant is applying makeup,
in response to determining that the occupant is applying makeup,
selecting, from among a plurality of air outlets including the air outlet provided in the cabin, a predetermined air outlet disposed in front of the occupant applying makeup,
acquiring the information relating to the area to which the occupant is applying makeup,
in response to the area to which the occupant is applying makeup is the predetermined area other than around the eyes, changing the air conditioning state to the first air conditioning state by changing said at least one of the air direction or the air volume of conditioned air from the predetermined air outlet, and
in response to the area to which the occupant is applying makeup is around the eyes, changing the air conditioning state to the second air conditioning state by changing said at least one of the air direction or the air volume of conditioned air from the predetermined air outlet.

13. The computer-readable non-transitory storage medium of claim 12, wherein
the program causes the processor to further execute:
after changing the air conditioning state to the second air conditioning state, judging whether or not the occupant has finished applying makeup around the eyes, and in response to judging that the occupant has finished applying makeup around the eyes, changing the air direction of the conditioned air toward the position of the face of the occupant.

14. An air conditioning control method, comprising:
determining whether or not an occupant in a cabin of a vehicle is applying makeup; and
in response to determining that the occupant is applying makeup, changing at least one of an air direction or an air volume of conditioned air that is generated by an air conditioning system installed at the vehicle and is supplied to the occupant from an air outlet provided in the cabin, wherein
the method further comprises:
acquiring information relating to an area to which the occupant is applying makeup, and
changing, with reference to the acquired information, said at least one of the air direction or the air volume of the conditioned air in accordance with the area to which the occupant is applying makeup, and
the method further comprises:
referencing the acquired information relating to the area to which the occupant is applying makeup and,
in response to the area to which the occupant is applying makeup being a predetermined area other than around eyes, changing said at least one of the air direction or the air volume of the conditioned air to thereby change an air conditioning state in the cabin to a first air conditioning state, and
in response to the area to which the occupant is applying makeup being around the eyes, changing said at least one of the air direction or the air volume of the conditioned air to thereby change the cabin to a second air conditioning state in which, compared to the first air conditioning state, the conditioned air supplied to the occupant is restricted.

15. The air conditioning control method of claim 14, wherein
in the cabin of the vehicle, a sun visor is disposed in front of the occupant, the sun visor including a mirror and a cover attached to a mirror side of the mirror, and
the method further comprises:
in response to the cover being open,
determining the mirror being in use, and
determining that the occupant is applying makeup, and
in response to the cover being closed,
determining the mirror being not in use, and
determining that the occupant is not applying makeup.

16. The air conditioning control method of claim 15, further comprising:
acquiring an image captured by a camera,
inferring a position of a face of the occupant based on a position of the eyes of the occupant in the captured image,
determining whether or not the occupant is applying makeup,
in response to determining that the occupant is applying makeup,
selecting, from among a plurality of air outlets including the air outlet provided in the cabin, a predetermined air outlet disposed in front of the occupant applying makeup,
acquiring the information relating to the area to which the occupant is applying makeup,
in response to the area to which the occupant is applying makeup is the predetermined area other than around the eyes, changing the air conditioning state to the first air conditioning state by changing said at least one of the air direction or the air volume of conditioned air from the predetermined air outlet, and
in response to the area to which the occupant is applying makeup is around the eyes, changing the air conditioning state to the second air conditioning state by changing said at least one of the air direction or the air volume of conditioned air from the predetermined air outlet.

17. The air conditioning control method of claim 16, further comprising:
after changing the air conditioning state to the second air conditioning state, judging whether or not the occupant has finished applying makeup around the eyes, and
in response to judging that the occupant has finished applying makeup around the eyes, changing the air direction of the conditioned air toward the position of the face of the occupant.

* * * * *